Dec. 23, 1969   R. ADLER   3,485,552
PHASED ARRAY-TYPE BEAM SCANNER WITH DISPERSION COMPENSATION
Filed Aug. 10, 1966

*INVENTOR.*
Robert Adler
BY
Attorney

United States Patent Office 3,485,552
Patented Dec. 23, 1969

3,485,552
PHASED ARRAY-TYPE BEAM SCANNER WITH DISPERSION COMPENSATION
Robert Adler, Northfield, Ill., assignor to Zenith Radio Corporation, Chicago, Ill., a corporation of Delaware
Filed Aug. 10, 1966, Ser. No. 571,510
Int. Cl. G02f *1/28, 1/36;* G02b *27/10*
U.S. Cl. 350—160         2 Claims

ABSTRACT OF THE DISCLOSURE

An improvement in a coherent light-scanning system of the type in which the laser beam to be scanned is multiply-reflected through a variable optical path between two mutually-facing surfaces one of which also allows a phased array of secondary beams to be transmitted is effected by placing an echelon transmission grating of a certain configuration in the path of these secondary beams. This grating configuration is selected so that the step height and width relationship is such as to compensate for the angular dispersion introduced by the scanning mechanism and to allow transmission of the corrected phased array to the far field where the scanning resultant forms.

---

The present invention pertains to light scanning systems. More particularly, it pertains to systems wherein time-coherent light is deflected or scanned. As used herein, the term "light" includes not only visible light but also that radiation of the same general character and having wavelengths either shorter or longer than those of visible light, including radiation in the infrared and ultraviolet regions.

The copending application of Adrianus Korpel, Ser. No. 528,217, filed Feb. 17, 1966 and assigned to the same assignee as the present application, discloses a light beam scanning system which includes a pair of mutually-facing substantially-parallel spaced mirrors one of which is partially transmissive of light. A primary beam of time-coherent light is directed relative to the mirror pair to establish multiple reflections of the primary beam between the mirrors with a portion of the light being transmitted through the one mirror at each point of such reflection and creating a corresponding plurality of substantially parallel secondary beams in the near-field beyond that mirror. The system further includes a means for varying the effective optical path length between the mirrors, as a result of which the propagation direction of the far-field beam is altered. In that system, the scanning mechanism is dispersive in the sense that the output image position depends upon wavelength of the light. Consequently, where light of more than one wavelength is produced by the source, the light output from the system is split among different exit angles corresponding to the different wavelengths present. This occurs, for example, when the light source is a gas laser which simultaneously operates upon a plurality of axial modes. Although such modes differ in wavelength only by about one part in a million, the resolving power of the Korpel system is sufficiently high as to cause the angular separation.

It is a general object of the present invention to provide a system of the foregoing character which includes new and improved means for compensating such dispersion.

A related object of the present invention is to provide such compensation means which is automatic in its operation.

A further object of the present invention is to provide a compensating means of the foregoing character which is comparatively simple of fabrication and use.

A light beam scanner constructed in accordance with the present invention includes the pair of mutually-facing substantially-parallel mirrors one of which is partially transmissive of light together with the means for directing a primary beam of time-coherent light relative to the mirror pair to establish multiple reflections of the primary beam between the mirrors with a portion of the light being transmitted through the one mirror at each point of such reflections thereon and creating a corresponding plurality of substantially parallel secondary beams in the near-field between the one mirror. The system further includes the means for varying the effective optical path length between the mirrors to alter the propagation direction of the far-field beam resulting from the secondary beams. The mirror pair is angularly dispersive of the light and to compensate that dispersion the scanner includes an echelon transmission grating disposed across and downbeam of the mirror pair. The grating has a step width and height selected to substantially compensate the afoersaid angular dispersion.

The features of the present invention which are believed to be novel are set forth with particularlity in the appended claims. The invention, together with further objects and advantages thereof, may best be understood, however, by reference to the following description taken in conjunction with the accompanying drawings in the several figures of which like reference numerals indicate like elements and in which:

Figure 1:
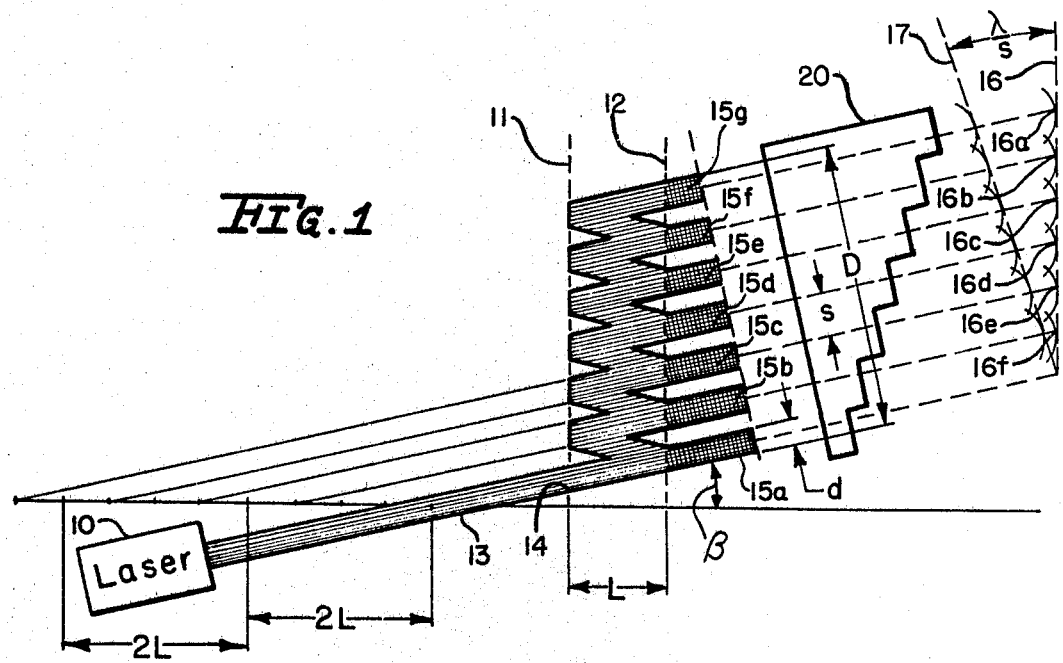
FIGURE 1 is a schematic diagram of one embodiment of the present invention.

The primary elements of the device of FIGURE 1 are a source 10 of time-coherent light, a pair of mutually-facing substantially-parallel spaced mirrors 11 and 12 and an echelon transmission grating 20. Mirror 12 is partially transmissive of the light from source 10. Source 10 advantageously is a laser which projects a beam 13 of the time-coherent light toward mirror 11.

Mirror 11 in this instance has an aperture 14 aligned to accept beam 13 and in the mirrors are oriented relative to beam 13 at an angle β to establish multiple reflections of the beam between the mirrors, progressively from the bottom to the top as illustrated in FIGURE 1. At each of the points of reflection on mirror 12, a portion of the light is transmitted through that mirror to form a corresponding plurality of substantially parallel secondary beams 15a–g in the near-field beyond mirror 12. By virtue of the reflections and the time coherence of the light, a relative phase difference exists between each successive pair of secondary beams 15a–15g. For a given light wavelength λ, angle of incidence β and mirror spacing L, the ultimate far-field beam resulting from a combination of the secondary beams has a wave front 16, effectively composed of the individual secondary-beam wave fronts 16a–16g, which propagates in a direction normal to the surface it defines.

In operation, the effective optical path length between mirrors 11, 12 is varied. For a given change in that path length, the ultimate far-field beam resulting from the secondary beams exhibits a wave front 17 which has a propagation direction different from that of wave front 16. In this manner, the far-field beam is caused to scan or to be deflected over a range of angles lying in the plane of the paper in FIGURE 1.

While definitions based upon beam fringing as against distance along the beam have been established to describe the length of the near-field for a light beam, in practice the transition from the group of highly-collimated near-field secondary beams to the ultimate resulting beam is a gradual transition. For clarity of illustration in FIGURE 1, the near-field condition beyond mirror 12 is illustrated by the double cross-hatched lines and the continuation of the secondary beams beyond the near-field region is represented by dashed lines.

As illustrated just in FIGURE 1, mirrors 11 and 12 are stationary and are spaced apart by a fixed distance. The system as thus far described causes scanning or deflection of the beam to occur merely upon a change in the wavelength of the light from laser 10. Alternatively the optical path length itself between mirrors 11, 12 may be physically changed as by affixing one of the mirrors to a piezoelectric transducer so that it is caused to vibrate toward and away from the other mirror in response to a scanning-control signal. These and other embodiments are described in more detail and claimed in the aforesaid Korpel application. Included in that description is the particular mirror-pair arrangement depicted herein in FIGURE 2, wherein mirrors 11 and 12 are affixed to opposing faces of a body 24 of electro-optical material.

Figure 2:
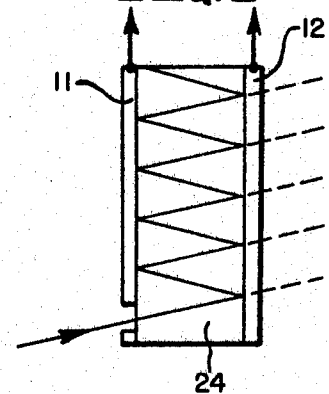
FIGURE 2 is a schematic representation of one of the elements included in FIGURE 1.

In FIGURE 2, mirrors 11 and 12 are electrically conductive (or at least are mirror surfaces on electrically-conductive material) so as to form electrodes individually connected across a source of electrical potential and responsive thereto to develop the longitudinal electro-optic effect in body 24. Alternatively, the two electrodes are formed on the lateral (top and bottom) surfaces of body 24 and the transverse electro-optic effect is used. In either case, the electric field developed between the electrodes in response to the applied electrical signal varies the index of refraction of body 24 and thereby likewise changes the optical path length between the mirrors. Suitable electro-optical materials with which the art already is familiar are those known as ADP, KDP, and KTN. A more detailed description of the apparatus employing one of these materials is set forth hereinafter.

Figure 3:
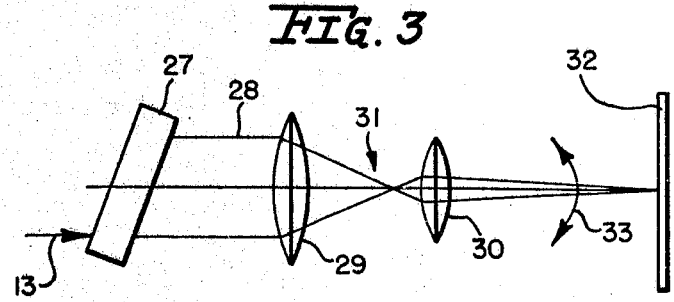
FIGURE 3 is a schematic diagram related to FIGURE 1 and depicting additional elements preferably incorporated therewith in a scanning system.

Preferably included in conjunction with the overall system of FIGURE 1 are the additional elements shown by FIGURE 3 in which an inverted telescope 31 is used in order to modify the scan angle. In FIGURE 3, the spaced-mirror system is simply illustrated by unit 27 which is composed of an actual system of mirrors 11 and 12 as in any of the previously-mentioned arrangements. Light beam 13 is directed into unit 27 from which there is developed a combined beam 28 representative of the bundle of individual secondary beams 15a–g depicted in more detail in FIGURE 1. Beam 28 passes successively through the object lens 29 and the eyepiece 30 of telescope 31 from whence the beam is ultimately directed upon a display screen 32. As explained above with reference to FIGURE 1, the action of the system including unit 27 is to cause the light beam impinging upon screen 32 to be deflected as indicated by the arrow 33.

Returning now with more particularity to the description of FIGURE 1 and still ignoring grating 20, mirrors 11, 12 have amplitude reflectivities $R_1$ and $R_2$ and the mirrors together define a light aperture D. The incoming light beam 13 has a diameter $d$ as does each of secondary beams 15a–g, neglecting diffraction spread of the multiply-reflected beam segments between the mirrors. The separation $s$ between the secondary beams is in accordance with the expression:

$$s = 2L \sin \beta \quad (1)$$

In order to avoid resonant entrance conditions, care preferably is taken to insure that the beams do not overlap; thus, $s > d$.

A variation $\Delta L$ in the optical path length between mirrors 11, 12 introduces a progressive phase variation of $4\pi \Delta L/\lambda$ radians per secondary beam across aperture D. This in turn changes the propagation direction of the resultant far-field wave front by the value $2\Delta L/s$. The maximum usable phase difference between neighboring secondary beams is $\pm \pi$, corresponding to a $\Delta L$ of $\pm \frac{1}{4}\lambda$ and resulting in a maximum total scan angle of $\lambda/s$. In FIGURE 1, this is indicated by the angle between wave fronts 16 and 17.

The beam spread in the far-field is determined by the overall aperture width and equals $\lambda/D$. Hence, the number of resolvable scan angles N equals $D/s$, which is an expression for the number of secondary beams in the phased array of those beams.

The upper limit to the usable number of secondary beams depends upon whether the system is aperture limited or loss limited. When the system is aperture limited, i.e., the value of D is finite and $R_1$ is equal to $R_2$ and these approach unity, the condition is that the last (top) beam in the array of secondary beams must not have a diffraction spread greater than that of the aperture itself; this is expressed:

$$N2L\lambda/d < D \quad (2)$$

When the secondary beams just touch, i.e., $s = d$, the expression becomes $$N < (D^2/2L\lambda)^{1/2} \quad (3)$$

When, on the other hand, the system is loss limited (i.e., $D = \infty$ and $R_1 R_2$ is less than unity), the system performance is described by means of an effective aperture value $D_e$. It can be shown that the value $D_e$ is equal to the length (in the direction of the multiple reflections) of that part of mirror 12 for which the secondary beams are attenuated by less than the value $\pi$ nepers, as detailed more fully in "An Ultrasonic Light Deflection System" by A. Korpel, et al., IEEE Journal on Quantum Electronics, vol. QE–1, pp. 60–61, April 1965. In terms of the reflectivities $R_1 R_2$, $$D_e = \pi d/(1 - R_1 R_2) \quad (4)$$

and $$N_{max} = \pi/(1 - R_1 R_2) \quad (5)$$

With realizable reflectivities $R_1 R_2$ of 99.7%, $10^3$ resolvable scan angles are feasible for the system of FIGURE 1.

The aforesaid analysis neglects the presence of multiple lobes in the far-field. An exact analysis of the operation of the device conveniently uses the virtual secondary beam sources located on a line perpendicular to mirrors 11 and 12 and spaced 2L apart as depicted in FIGURE 1. Additional analysis reveals that the number of significant side lobes (i.e., comparable in intensity to the main beam) is approximately $2s/d$, and they are spaced $\lambda/s$ apart. The side lobes, however, are irrelevant to the basic operation of the device described except insofar as they represent loss in light intensity.

Summarizing for a moment, mirror 11 is essentially a perfect reflector and mirror 12 has a small but finite transmissivity such that, for example, approximately one-half of one percent of the light is transmitted at each reflection from mirror 12. The result is the production of a linear array of secondary beams transmitted through mirror 12 with a constant phase difference between adjacent beams of a value determined by the optical path difference between the mirrors along the tilt angle $\beta$. As is shown in detail in the aforesaid Korpel application, the number of resolvable scan angles is approximately equal to the number of secondary beams in the array emerging from mirror 12. The effective number of spots $N_e$ in the near-field is determined by the total reflectivity $R_1 \times R_2$ which in turn determines the distribution in the relative intensity of the beams in the scanning direction. The Korpel application analyzes the intensity distribution in more detail. It may be noted that, neglecting diffraction spreading of the secondary beams, the distribution of intensity in the scanning direction is exponential. The position in the transverse direction of the Nth beam is $x=(N-1)s$, where $s$ is 1, 2, 3 . . .

As an example of a specific arrangement designed to produce at least 1,000 resolvable scan angles in the embodiment of FIGURE 1 together with FIGURE 2, the following design parameters are given merely by way of illustration and in no sense by way of limitation:

| | | |
|---|---|---|
| Wavelength $\lambda$ | micron | 0.6328 |
| Mirror reflectivity $R_1 R_2$ | | $\approx 0.997$ |
| Beam diameter $d$ | millimeter | 0.1 |
| Mirror spacing $L$ | do | 0.5 |
| Spot spacing $s$ | do | 0.1 |
| Effective aperture width $D_e$ | centimeters | $\approx 10.1$ |
| Effective number of spots $N_e$ | | $\approx 1,000$ |
| Tilt angle $\beta$ | degrees | 5.74 |
| Scan angle $\phi_s$ | radians | $6.328 \times 10^{-3}$ |
| Far-field half-power spot angle $\phi_D$ | do | $6.328 \times 10^{-6}$ |

In this example, the reflectivity is chosen to give approximately the number of spots required. The beam diameter is chosen to be equal to the spot spacing which in turn is chosen to give a reasonable aperture width. The mirror spacing and tilt angle, however, must be chosen with due consideration to the electro-optic material.

From the standpoint of diffraction spreading alone, the minimum practical spacing should be employed, so that the spread of the last secondary beam will not be so large that it exceeds the available aperture. On the other hand, the mirror spacing must be sufficient, of course, to avoid electrical breakdown of the electro-optic material. Also to be avoided is saturation of the linear electro-optic effect by reason of higher-order non-linearities at higher electric field strengths. To be considered in any design with respect to the lower limit of mirror spacing is that the tilt angle for a given beam spacing varies approximately inversely with mirror spacing. Since it is desired that the light travel approximately parallel to the optic axis of the material in body 24, the tilt angle preferably is kept below about 10°.

In the present state of the art, the material KD*P (deuterated potassium dihydrogen phosphate) is appropriate for the material of body 24. Its half-wave retardation voltage at room temperature is 3400 volts, less than half of that of KDP which is one of the alternatives hereinbefore mentioned. Since the refractive index of KD*P is approximately 1.5, the indicated optical thickness of 0.5 millimeter corresponds to a physical thickness of 0.33 millimeter of 0.013 inches. Consequently, at the half-wave retardation voltage, the electrical field strength is approximately 260 volts per mil which is safely below the breakdown voltage of this material. In practice, only about one-half that voltage is necessary for operation over the range $\pm \lambda/4$.

While body 24 in accordance with the foregoing parameter is a comparatively thin plate, mechanical problems are avoided by rigidly mounting this plate on a rigid substrate which itself forms or which is coated to form passive mirror 11. Ordinary techniques of grinding, polishing and coating are utilized to insure the necessary tolerance in flatness over the entire plate.

The preceding analysis does not fully account for diffraction spread of the light beam as it propagates back and forth between mirrors 11 and 12. Since the angular divergence of the beam is inversely proportional to the minimum beam diameter, the use of a very small beam at the entrance point of aperture 14 results in a relatively large divergence angle. Conversely, when a small divergence angle is required, a relatively large beam at the input is indicated; the latter increases the necessary aperture size of a given number of spots. For the exemplary parameters set forth above, the half-angle beam divergence $\theta$ is given by the expression:

$$\theta = \lambda/d \cong 6.328 \times 10^{-3} \text{ radians} \qquad (6)$$

The total distance Z travelled by the beam up to the last near-field spot is:

$$Z = 2LN/\cos \beta \cong 1.00 \text{ meters} \qquad (7)$$

Equations 6 and 7 yield for the final diameter of the 1,000th beam the value $(Z\theta)$ of 6.3 millimeters. It can thus be seen that, while diffraction spreading of the beam produces considerable overlap between near-field spots, the final beam size is still small enough to be reasonably contained within the aperture selected.

It has been shown that the position of the far-field spot depends fundamentally on the optical path difference between two adjacent near-field spots. The three physical parameters which directly enter into the determination of this position are the mirror spacing $L$, the tilt angle $\beta$ and the radiation wavelength $\lambda$. The sharpness of the far-field spot is also dependent upon the total number of spots, or the aperture width. It is of interest, however, to consider only the position of maximum intensity, not its sharpness. Since the physical variables $L$ and $\lambda$ enter into the expressions given as a ratio, it is evident that a fractional change in wavelength $\lambda$ is just as effective in producing a displacement of the far-field spot as is the same fractional change in the mirror spacing $L$. For this reason, the scanning mechanism is dispersive in the sense that the output image position depends upon wavelength. The system is, in fact, a directional filter, since the image position also depends upon the direction of light injection, upon the tilt angle $\beta$.

When dispersion is not sufficiently small to be below the resolution limit, it is contemplated that it be compensated to a sufficient degree of accuracy so as not to degrade the resolution. The difficulty with such dispersion is emphasized by the fact that the small wavelength difference corresponding to the different longitudinal modes in the conventional helium-neon laser can easily be resolved in a system designed for only approximately 100 lines of resolution. Several different approaches to such compensation are disclosed and claimed in the aforesaid Korpel application; grating 20 also is described therein inasmuch as it becomes a preferred embodiment.

The present invention is directed to the inclusion, in the system as otherwise illustrated in FIGURE 1, of echelon transmission grating 20. Grating 20 is disposed in the near-field of the secondary beams emerging from mirror 12. As embodied, grating 20 is formed of glass sheet having one side 35 flat and disposed generally transverse to the secondary beams. Its opposite side is shaped like a stairway having a series of steps 36 and risers 37 each of width $g$ in the direction across the beams and of height $t$ in the direction of the beams.

Figure 4:
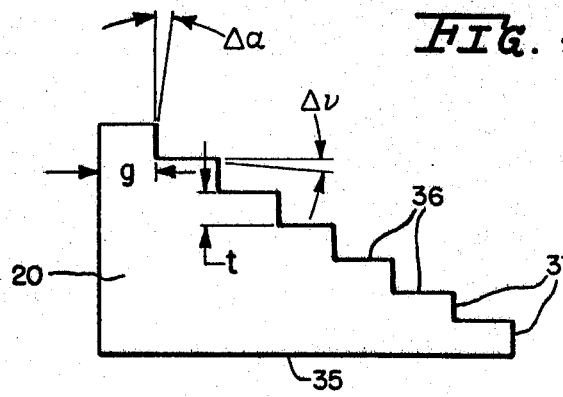
FIGURE 4 is a diagramatic representation of another one of the elements included in FIGURE 1.

The function of grating 20 is to produce a steering of the light beams which depends only upon wavelength of the light. High order interference between light travelling just inside and outside of the steps, in this case in the direction parallel to risers 37, yields a high degree of dispersion. When the number of wavelengths inside and outside one of the steps differs by an integral number, light is transmitted through the grating without change of direction. However, when the wavelength is of a slightly different value, the path difference per step is no longer an integral number of wavelengths and the wave front is tilted by an amount $\Delta\nu$ corresponding to a change in light propagation direction $\Delta\alpha$ (FIGURE 4).

In accordance with the invention, the material from which grating 20 is made is selected with respect to its index of refraction and the steps are formed to have widths and heights of respective values such that the dispersion produced by the scanning mechanism is effectively cancelled by the grating. For a given material having an index of refraction $n$, the step-width $g$ and the height $t$ are selected to satisfy the relationship:

$$\tan \beta \cong g/t(n-1) \qquad (8)$$

where $\beta$ is the exit angle of the secondary beams from mirror 12.

Analyzing the operation of the scanning mechanism composed of mirrors 11, 12 and electro-optic body 24, and noting that the wave front must be perpendicular to the direction of propagation, $$2L \cos \beta = M\lambda \qquad (9)$$

where M is an integer.

Rewriting this for $K=2\pi/\lambda$ (where K is the free-space propagation constant of the light).

$$2L \cos \beta = 2\pi M/K \qquad (10)$$

or $$K \cdot \cos \beta = M/L \qquad (11)$$

To determine the change of angle resulting from a change in propagation constant, M and L are set as constants. Thus, $$K \cdot \cos \beta = \text{constant}, \qquad (12)$$

$$d(K \cdot \cos \beta) = 0, \qquad (13)$$

$$\cos \beta \cdot dK - K \sin \beta \cdot d\beta = 0, \text{ and} \qquad (14)$$

$$\frac{d\beta}{dK} = \frac{\cos \beta}{K \sin \beta} = \frac{1}{K \tan \beta} \qquad (15)$$

Having thus found the rate at which the deflection angle changes with respect to K, the deflection produced by the echelon grating is calculated. Inside a step of height $t$ in a material of refractive index $n$, the phase delay is $nKt$. Outside, for the same length, it is $Kt$. The phase difference is thus $(n-1)Kt$. It is now assumed that $t$ is so chosen that for a given propagation constant $K_0$, the phase difference $(n-1)Kt$ equals an integral multiple of $2\pi$. Wave fronts inside and outside the transparent material are then in phase at the front surface of each step, and the light is not deflected.

Now K is allowed to change by a small amount $dK$. The wave fronts inside and outside are then offset by a phase difference of $(n-1)tdK$, corresponding to a displacement of $(n-1)tdK/K$. One such displacement occurs per step width $g$, producing a combined wave front which is tilted with respect to that of the incoming light by an angle $$\frac{(n-1)t}{Kg} K \qquad (16)$$

This change in direction, or in deflection angle $\alpha$, varies with respect to the propagation constant K as follows:

$$\frac{d\alpha}{dK} = \frac{(n-1)t}{Kg} \qquad (17)$$

The direction in which the light is deflected in response to an increase or decrease in K depends on the sign of $t/g$, which may be viewed as indicating the direction of the steps.

To obtain cancellation of the change of angle with respect to K, the two derivatives are set equal to each other:

$$\frac{1}{K \tan \beta} = \frac{(n-1)t}{Kg} \qquad (18)$$

$$\tan \beta = \frac{g}{t(n-1)} \qquad (8)$$

It is, of course, the purpose of the light deflection system to change $\beta$ over a certain range; compensation of the chromatic error (change of K) is strictly possible only for a specific angle $\beta_0$, and an angle in the center of the intended deflection range is normally chosen for the point $\beta_0$ at which cancellation is perfect.

For the example given previously and utilizing an echelon material having an index of refraction of 1.5, and assuming no alignment error, Equation 8 yields a ratio of step height to step width of twenty. Moreover, analysis reveals that the alignment accuracy for such an echelon gating is no more critical than that required for other components of the overall system.

Incorporation of the particular echelon transmission grating as disclosed into what may be generally termed as the Korpel scanning system thus results in compensation of angular dispersion in the scanning mechanism itself. Consequently, even though the light source may have light of several different wavelengths differing by extremely small amounts, the inclusion in the combination of the dispersion grating enables recombination of the light of the different wavelengths into a single output beam.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A phased-array coherent light beam scanning system comprising:

a pair of mutually-facing substantially-parallel reflective surfaces, one of which is partially transmissive of light;

a laser for producing a primary beam of coherent light;

means for deflecting said coherent primary beam comprising means for directing it into the interspace between said mutually-facing surfaces at an acute incidence angle to produce multiple internal reflections within said interspace and transmit a plurality of differently-phased substantially parallel secondary beams in the near optical field beyond said one surface, and further comprising means for varying the effective optical path length between said mutually-facing surfaces to change the relative phase relations between different ones of said near-field secondary beams and thus to change the propagation direction of the far-field beam resulting from said near-field secondary beams;

and an echelon transmission grating disposed across said secondary beams and having a step width and height selected to substantially compensate the angular dispersion of said mirror pair.

2. A light beam scanner comprising:

a pair of mutually-facing substantially-parallel mirrors one of which is partially transmissive of light;

means for directing a primary beam of time-coherent light relative to said mirror pair to establish multiple reflections of said primary beam between the mirrors with a portion of said light being transmitted through said one mirror at each point of such reflections thereon and creating a corresponding plurality of substantially parallel secondary beams in the near-field beyond said one mirror;

means for varying the effective optical path length between said mirrors to alter the propagation direction of the far-field beam resulting from said secondary beams, said mirror pair being angularly dispersive of said light;

and an echelon transmission grating disposed across said secondary beams and having a step width and height selected to substantially compensate the angular dispersion of said mirror pair, said step width and height being selected consistent with the expression:

$$\tan \beta = g/t(n-1),$$

where $\beta$ is the approximate exit angle of said secondary beams from said one mirror, $g$ is the step width transverse to said secondary beams, $t$ is the step height in the direction of said secondary beams, and $n$ is the index of refraction of the echelon material.

References Cited

UNITED STATES PATENTS 3,334,538  8/1967  Steinhausen _____ 88—14

FOREIGN PATENTS 26,669  5/1936  Australia.

RONALD L. WIBERT, Primary Examiner

PAUL K. GODWIN, Assistant Examiner

U.S. Cl. X.R.

350—169, 174